US011525973B2

(12) United States Patent
Li et al.

(10) Patent No.: US 11,525,973 B2
(45) Date of Patent: Dec. 13, 2022

(54) MULTI-LENS CAMERA

(71) Applicant: HANGZHOU HIKVISION DIGITAL TECHNOLOGY CO., LTD., Hangzhou (CN)

(72) Inventors: Yang Li, Hangzhou (CN); Caisheng Yan, Hangzhou (CN); Zhiqiang Rong, Hangzhou (CN); Zhan Ye, Hangzhou (CN); Peng Xu, Hangzhou (CN)

(73) Assignee: HANGZHOU HIKIVISION DIGITAL TECHNOLOGY CO., LTD., Hangzhou (CN)

( * ) Notice: Subject to any disclaimer, the term of this patent is extended or adjusted under 35 U.S.C. 154(b) by 244 days.

(21) Appl. No.: 16/771,363

(22) PCT Filed: Nov. 30, 2018

(86) PCT No.: PCT/CN2018/118693
§ 371 (c)(1),
(2) Date: Jun. 10, 2020

(87) PCT Pub. No.: WO2019/128627
PCT Pub. Date: Jul. 4, 2019

(65) Prior Publication Data
US 2021/0072486 A1 Mar. 11, 2021

(30) Foreign Application Priority Data

Dec. 27, 2017 (CN) .......................... 201711454003.2
Dec. 27, 2017 (CN) .......................... 201711455355.X (51) Int. Cl.
*G02B 7/02* (2021.01)
*G03B 37/00* (2021.01)

(52) U.S. Cl.
CPC .............. *G02B 7/021* (2013.01); *G03B 37/00* (2013.01)

(58) Field of Classification Search
CPC .......... G08B 13/19619; G08B 13/1963; G08B 13/19641; G03B 17/02; G03B 37/04;
(Continued)

(56) References Cited

U.S. PATENT DOCUMENTS 6,354,749 B1 * 3/2002 Pfaffenberger, II .......................... G08B 13/19632
396/428
7,719,610 B2 * 5/2010 Kung ................... H04N 5/2252
348/374

(Continued)

FOREIGN PATENT DOCUMENTS

| CN | 1752479 | 3/2006 |
|---|---|---|
| CN | 201247380 | 5/2009 |

(Continued)

OTHER PUBLICATIONS

International Search Report and Written Opinion issued in Corresponding PCT Application No. PCT/CN2018/118693, dated Feb. 27, 2019 (English Translation provided).

(Continued)

*Primary Examiner* — Chiawei Chen
(74) *Attorney, Agent, or Firm* — Norton Rose Fulbright US LLP (57) ABSTRACT

A multi-lens camera includes a main housing assembly, lenses, a lens adjuster and a transparent cover. The transparent cover is mounted on the main housing assembly; the lens adjuster is mounted in the space formed by the main housing assembly and the transparent cover; the transparent cover includes a flat portion and a curved portion surrounding the flat portion; the lenses are located in the space covered by the curved portion; the lens adjuster includes a fixing disc and at least two lens brackets; each of the lens brackets includes a first bracket and a second bracket arranged on the first bracket; the first support is movably (Continued)

arranged on the fixing disc, and is capable of moving along the circumferential direction of the fixing disc; a lens is rotationally engaged with the second bracket, such that the lens rotates around axis thereof.

16 Claims, 11 Drawing Sheets

(58) Field of Classification Search
CPC .... G03B 37/00; G03B 17/561; H04N 5/2251; H04N 5/2252; H04N 5/2258; H04N 5/23299; H04N 5/247; H04N 5/2259; G02B 7/021
See application file for complete search history.

(56) References Cited

U.S. PATENT DOCUMENTS

| | | | |
|---|---|---|---|
| 8,659,837 B2* | 2/2014 | Chen | H04N 5/2259 |
| | | | 359/694 |
| 9,438,782 B2* | 9/2016 | Donaldson | H04N 5/2258 |
| 10,567,622 B2* | 2/2020 | Park | H04N 5/2251 |
| 2007/0053681 A1* | 3/2007 | Arbuckle | F16M 11/2014 |
| | | | 396/427 |
| 2008/0013149 A1 | 1/2008 | Viglione et al. | |
| 2012/0106942 A1* | 5/2012 | Mukai | G03B 37/00 |
| | | | 396/427 |
| 2012/0217356 A1* | 8/2012 | Park | F16M 11/08 |
| | | | 248/122.1 |
| 2012/0242788 A1* | 9/2012 | Chuang | G08B 13/19602 |
| | | | 348/E7.001 |
| 2017/0139309 A1* | 5/2017 | Axelsson | H04N 5/2251 |
| 2017/0255083 A1* | 9/2017 | Donaldson | G03B 19/023 |
| 2017/0322482 A1* | 11/2017 | Axelsson | G08B 13/1963 |
| 2019/0191059 A1* | 6/2019 | Park | H04N 7/181 |

FOREIGN PATENT DOCUMENTS

| | | | |
|---|---|---|---|
| CN | 202735674 | 2/2013 | |
| CN | 104880211 | 9/2015 | |
| CN | 204942947 | 1/2016 | |
| CN | 205179192 | 4/2016 | |
| CN | 205305020 | 6/2016 | |
| CN | 105898119 | 8/2016 | |
| CN | 106641629 | 5/2017 | |
| CN | 206728124 | 12/2017 | |
| CN | 207573492 | 7/2018 | |
| CN | 207939601 | 10/2018 | |
| CN | 208079235 | 11/2018 | |
| EP | 2887328 | 6/2015 | |
| EP | 3168819 | 5/2017 | |
| WO | WO 2004/095386 | 11/2004 | |
| WO | WO-2004095386 A1 * | 11/2004 | ....... G08B 13/19619 |

OTHER PUBLICATIONS

Extended European Search Report issued in Corresponding European Application No. 18897214.5, dated Jan. 22, 2021.
Office Action issued in Corresponding European Application No. 18897214.5, dated Jun. 9, 2022.

* cited by examiner

MULTI-LENS CAMERA

CROSS-REFERENCE TO RELATED APPLICATIONS

The present application is a national phase application under 35 U.S.C. § 371 of International Application No. PCT/CN2018/118693, filed Nov. 30, 2018, which claims the priority to a China Patent Application No. 201711455355.X, filed with China National Intellectual Property Administration on Dec. 27, 2017 and entitled "Multi-Lens Camera", and the priority to a China Patent Application No. 201711454003.2, filed with China National Intellectual Property Administration on Dec. 27, 2017 and entitled "Multi-Lens Camera", which are incorporated herein by reference in their entireties.

TECHNICAL FIELD

The present application relates to the technical field of camera design, and in particular, to a multi-lens camera.

BACKGROUND

A multi-lens camera, as typically used in image acquisition, has a plurality of lenses on the camera body arranged along the circumference direction thereof. A three-axis adjustment can be performed for each of the lenses independently in order to achieve the adjustment of the capturing angle. Images captured by the plurality of lenses can constitute a panoramic image for the multi-lens camera.

Generally, the lenses are fixed on a mounting disc by means of lens brackets. During the P-direction adjustment, the mounting disc is able to rotate relative to the camera body, thereby achieving the rotation of the lenses in a direction parallel to the mounting disc, that is, achieving the P-direction adjustment. When the lenses are adjusted in place, the mounting disc will be locked relative to the camera body with fastening screws or magnets, thereby enabling the lenses to be maintained in the adjusted positions. Locking the mounting disc with fastening screws requires frequent loosening and tightening operations, which has the problems of cumbersome operation and low operation efficiency. The mounting disc is fixed by magnet adsorption and then the lenses are able to be locking-positioned, which can simplify the operation and increase the efficiency of adjustment. However, the using of a magnet for locking the lenses requires a larger piece of magnet arranged on the camera body, which increases the weight and cost of the adjustable multi-lens camera.

SUMMARY

An embodiment of the present application provides a multi-lens camera, to solve the problems of large weight and high cost for the multi-lens camera using a magnet to lock the mounting disc.

To solve the above problems, an embodiment of the present application uses the following technical solutions.

A multi-lens camera includes a main housing assembly, lenses, a lens adjuster, and a transparent cover; wherein, the transparent cover is mounted on the main housing assembly; the lens adjuster is mounted in a space formed by the main housing assembly and the transparent cover; the transparent cover comprises a flat portion and a curved portion surrounding the flat portion; the lenses are located in a space covered by the curved portion; the lens adjuster comprises a fixing disc and at least two lens brackets; each of the lens brackets comprises a first bracket and a second bracket arranged on the first bracket; the first bracket is movably arranged on the fixing disc and able to move along a circumferential direction of the fixing disc; and a lens is rotationally engaged with the second bracket in order to enable the lens to rotate around its own axis.

At least one of the technical solutions used in the embodiment of the present application can achieve the following beneficial effects.

In the multi-lens camera disclosed in the embodiment of the present application, the transparent cover is mounted on the main housing assembly and the transparent cover includes a flat portion and a curved portion; the curved portion is arranged surrounding the flat portion, and the lenses are mounted in the space covered by the curved portion. The above solution can improve the resistance to deformation of the transparent cover. At the same time, in the lens adjuster, the lens bracket includes the first bracket and the second bracket, the first bracket can drive the lens to move along the circumferential direction of the fixing disc by means of the second bracket, thereby achieving the P-direction adjustment of the lens, while the lens can rotate around its own axis relative to the second bracket, thereby achieving the R-direction adjustment. The multi-lens camera disclosed in the embodiment of the present application, after the P-direction adjustment of the lenses are in place, can automatically achieve self-locking fixation without locking the entire fixing disc by means of magnets, screws, etc., and the direction may be adjusted by hands, thereby simplifying the process of operation, increasing the efficiency of operation, and reducing the whole weight and the cost.

In addition, according to a method and apparatus for processing passenger flow information provided in the embodiment of the present application, the passenger flow information acquired based on a method for acquiring the passenger flow information provided in the embodiment of the present application is processed by statistics, to further provide reference data for business analysis and data in-depth mining, etc.

BRIEF DESCRIPTION OF THE DRAWINGS

In order to illustrate the technical solutions of the embodiments of the present application or of the prior art more clearly, the drawings used in the embodiments or in the prior art will be briefly described below. Obviously, the drawings described below are just some embodiments of the present application and other drawings may be obtained by those skilled in the art based on these drawings without any creative effort.

List of Reference Numbers:
100—fixing disc, 110—first tooth slot, 120—avoidance hole;
200—lens bracket, 210—first bracket, 211—connection base, 211a—second fastener, 211b—second engaging tooth, 211c—first tightening protrusion, 211d—second elastic arm, 211e—first fastener, 212—supporting arm, 213—connection plate, 213a—snap-in hole, 213b—second tooth slot, 214—first engaging tooth, 215—elastic connection portion, 220—second bracket, 221—tightening disc, 222—annular structure member, 222a—third engaging tooth, 222b—third fastener, 222c—protrusion stop, 222d—first limiting part, 221a—tightening slot, 214a—second tightening protrusion, 214b—third limiting part, 221b—forth limiting part, 214c—supporting arm body, 214d—fixing block, 214e—screw;
300—lens, 310—third tooth slot, 320—second limiting part;
400—main housing assembly;
500—transparent cover, 510—flat portion, 520—curved portion;
600—supporting mechanism, 610—supporting body, 620—elastic pad;
700—lens accommodating space.

DETAILED DESCRIPTION

In order to explain the purpose, technical solutions, and advantages of the present application more clearly, the present application is described in detail with reference to the drawings and embodiments below. Obviously, the embodiments described are only a part, but not all of the embodiments of the present application. Based on the embodiments of the present application, all other embodiments obtained by those skilled in the art without any creative effort should fall within the scope of protection of the present application.

The technical solutions provided in various embodiments of the present application will be described in detail with reference to the drawings.

Figure 1:
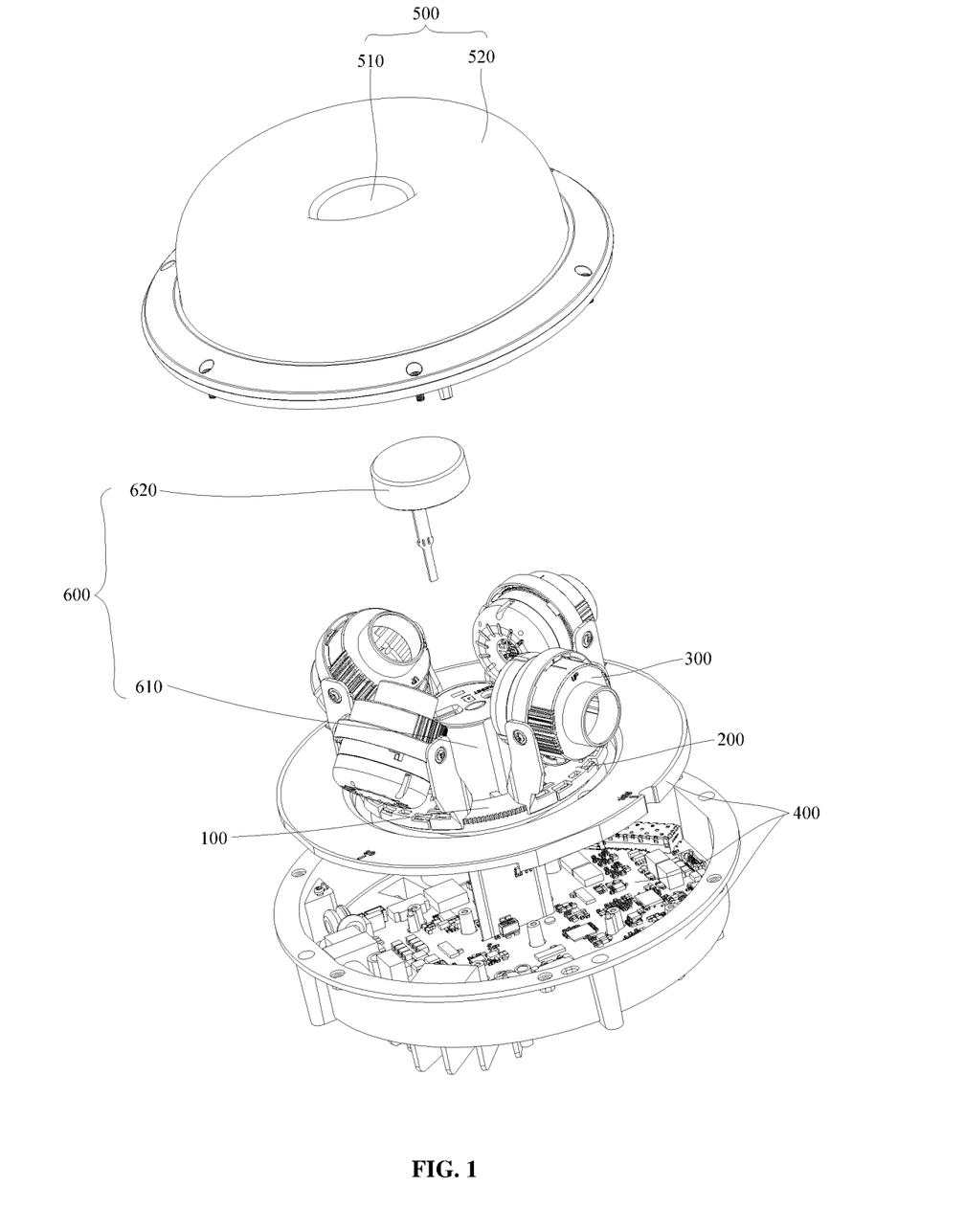
FIG. 1 is an exploded schematic structural diagram of a multi-lens camera according to an embodiment of the present application.

Referring to FIG. 1, a multi-lens camera according to an embodiment of the present application includes: a lens adjuster, a main housing assembly 400, a transparent cover 500 and lenses 300.

The main housing assembly 400 typically includes a plurality of components, and the main housing assembly 400 provides the mounting base or accommodating space for the other components of the multi-lens camera. The transparent cover 500 is mounted on the main housing assembly 400, and the lens adjuster is mounted within a space formed by the transparent cover 500 and the main housing assembly 400. The transparent cover 500 is typically fixed on the main housing assembly 400 in a fixed manner. The transparent cover 500 includes a flat portion 510 and a curved portion 520 surrounding the flat portion 510. In a specific implementation, the flat portion 510 is located at the center of the transparent cover 500, and the curved portion 520 is distributed around the flat portion 510.

The disclosed lens adjuster includes a fixing disc 100 and at least two lens brackets 200. The fixing disc 100 is included in the camera host of the multi-lens camera; the fixing disc 100 is the mounting base for the lens brackets 200 and the lenses 300; and the lenses 300 are arranged on the fixing disc 100 by means of the lens brackets 200.

Figure 2:
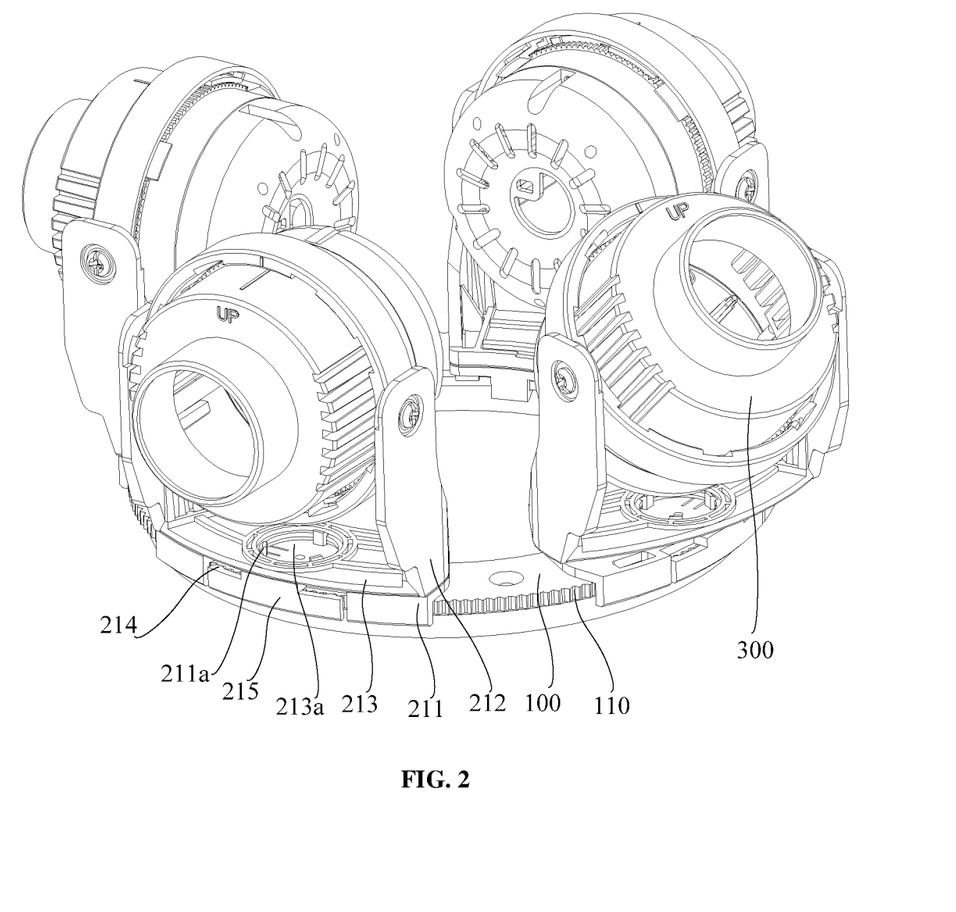
FIG. 2 is a schematic structural diagram of a state of a lens adjuster mounted with lenses according to an embodiment of the present application.
Figure 3:
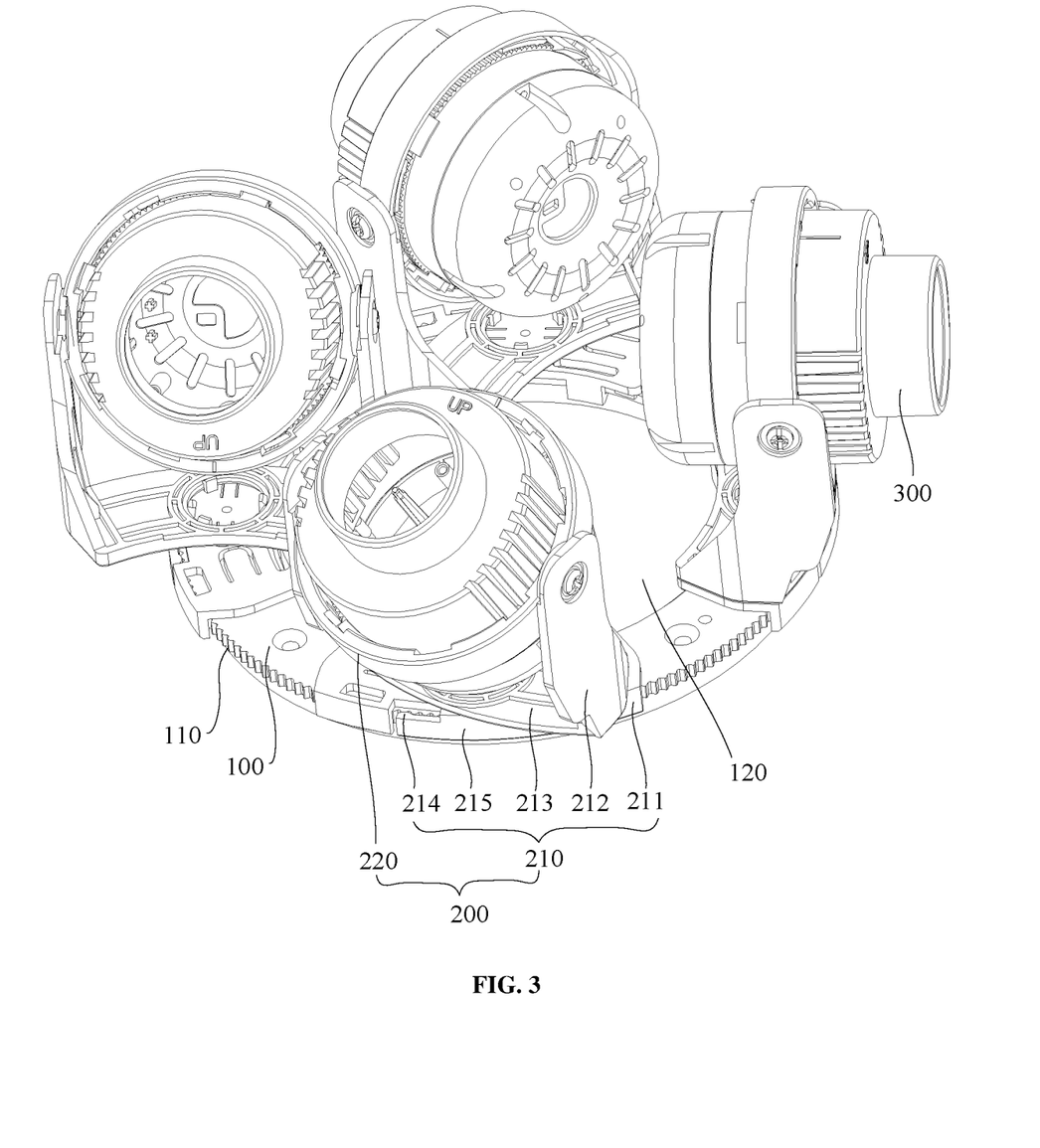
FIG. 3 is a schematic structural diagram of another state of a lens adjuster mounted with lenses according to an embodiment of the present application.
Figure 4:
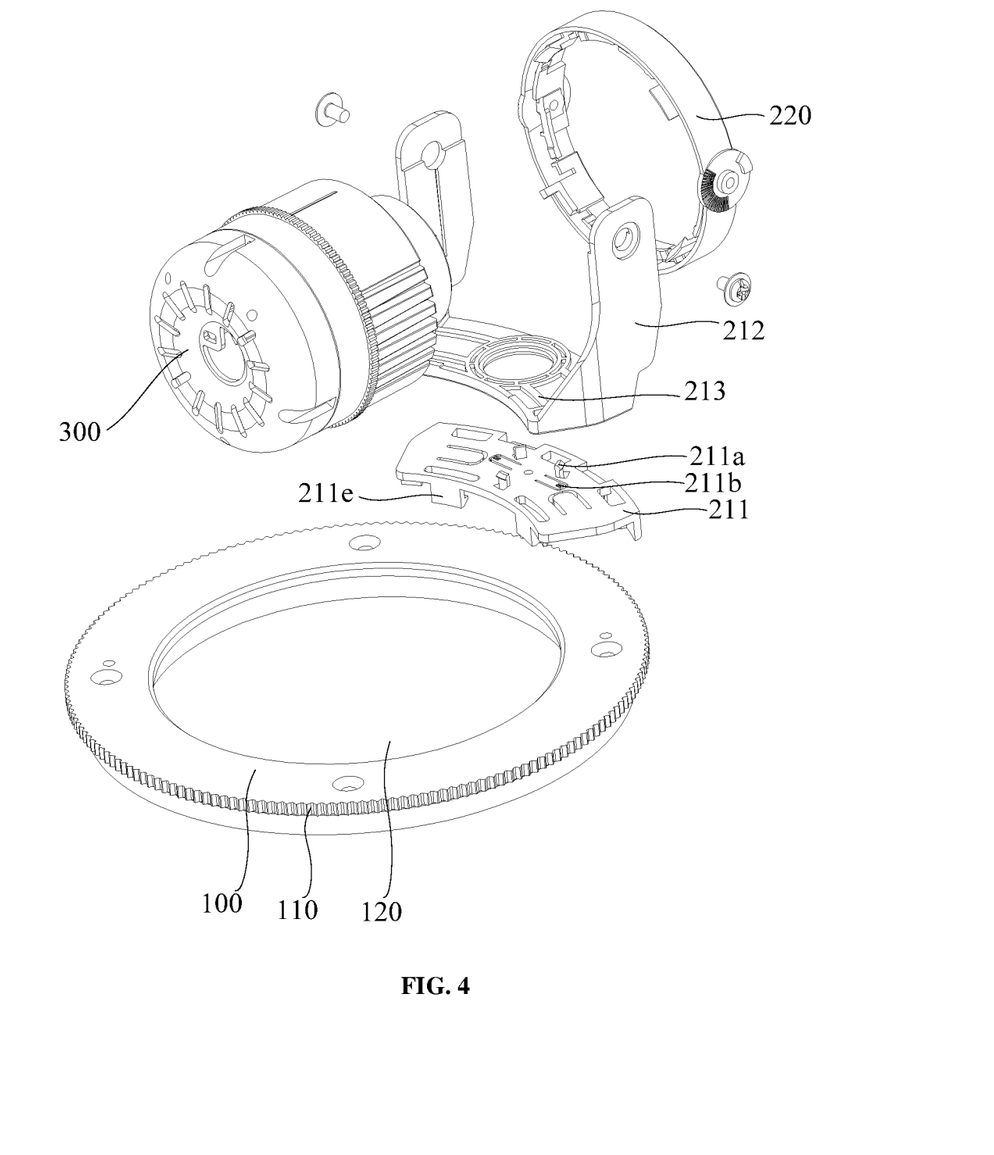
FIG. 4 is an exploded schematic structural diagram of some components of the structure shown in FIG. 3.

Referring to FIGS. 2 to 4, a lens bracket 200 includes a first bracket 210 and a second bracket 220 arranged on the first bracket 210. The lenses 300 are mounted on the second brackets 220 and are located within a space covered by the curved portion 520. The first brackets 210 are movably arranged on the fixing disc 100, and can then move relative to the fixing disc 100; the first brackets may move typically along the circumferential direction of the fixing disc 100. The movement of the first brackets 210 can drive the second brackets 220 and the lenses 300 to move to follow the movement of the first brackets, and can then adjust the positions of the lenses 300 on the fixing disc 100, and finally achieve the P-direction (moving in a plane parallel to the fixing disc 100) adjustment of the lenses 300, so that the lenses 300 move in a plane parallel to the fixing disc 100. The lenses 300 are rotationally engaged with the second brackets 220, in order to enable the lenses 300 to rotate around themselves, thereby achieving the R-direction adjustment of the lenses 300.

In the multi-lens camera disclosed in the embodiment of the present application, the transparent cover 500 is mounted on the main housing assembly 400, and the transparent cover 500 includes a flat portion 510 and a curved portion 520; the curved portion 520 is arranged surrounding the flat portion 510, and the lenses 300 are mounted in the space covered by the curved portion 520. The above solution can improve the resistance to deformation of the transparent cover 500. At the same time, in the lens adjuster, the lens brackets 200 include first brackets 210 and second brackets 220; the first brackets 210 are able to drive the lenses 300 to move along the circumferential direction of the fixing disc 100 by means of the second brackets 220, thereby achieving the P-direction adjustment of the lenses 300, while the lenses 300 are able to rotate around their own axes relative to the second brackets 220, thereby achieving the R-direction adjustment. The multi-lens camera disclosed in the embodiment of the present application, after the P-direction adjustment of lenses are in place, can automatically achieve self-locking fixation without locking the entire fixing disc by means of magnets, screws, etc., and the direction may be adjusted by hands, thereby simplifying the process of operation, increasing the efficiency of operation, and reducing the whole weight and the cost.

In a specific implementation, one of each of the first brackets 210 and the fixing disc 100 may be provided with first tooth slots, and the other one of the both may be provided with first engaging teeth, which engage with the first tooth slots. The first bracket 210 is connected to the fixing disc 100 by means of the engagement between the first tooth slots with the first engaging teeth.

In the lens adjuster disclosed in the embodiment of the present application, a lens 300 is mounted on the first bracket 210, and can then move on the fixing disc 100 to follow the first bracket 210, thereby achieving the adjustment of the position of the lens 300 on the fixing disc 100. The first bracket 210 is connected to the fixing disc 100 by means of the engaging between the first tooth slots and the first engaging teeth. During the adjustment, the operator can drive the first bracket 210 to move by applying a certain force. During the movement of the first bracket 210, the first tooth slots and the first engaging teeth move relative to each other. After the adjustment is completed (the external force is removed), the engaging between the first tooth slots and the first engaging teeth can ensure that the first bracket 210 is positioned at the adjusted position, finally completing the adjustment of the lens 300.

Compared with the way of achieving the lens fixation in the prior art, the lens adjuster disclosed in the embodiment of the present application can automatically achieve self-locking fixation, and the direction may be adjusted by hands.

Referring to FIGS. 2-7, in a specific implementation, the circular edge of the fixing disc 100 is partly or entirely provided with first tooth slots 110, and accordingly, the first bracket 210 is provided with first engaging teeth 214. The first bracket 210 is able to move around the circumferential direction of the fixing disc 100, and then is able to rotate around the circumferential direction of the fixing disc 100. The rotation of the first bracket 210 can drive the lens 300 to rotate to follow the rotation of the first bracket, and then is able to adjust the position of the lens 300 on the fixing disc 100. The adjustment of this position is performed in the disc surface parallel to the fixing disc 100, which is the P-direction adjustment of the lens 300. Of course, the first tooth slots 110 may be arranged on the first bracket 210, and accordingly, the first engaging teeth 214 are arranged on the fixing disc 100.

A first bracket 210 may include an elastic connection portion 215, and the elastic connection portion 215 may be provided with first engaging teeth 214, and the first engaging teeth 214 engage with the first tooth slots 110. It should be noted that, in the embodiment of the present application, the engaging between the first tooth slots and the first engaging teeth means that the both are in a positioning state, in which the first tooth slots and the second engaging teeth cannot move relative to each other, when they are not subjected to the external force; and when the first tooth slots or the first engaging teeth are elastically deformed by the external force, the positioning-engaging between the both is released, so that the first tooth slots and the second engaging teeth are able to move relative to each other, thereby achieving that the first bracket 210 is movable around the circumferential direction of the fixing disc 100, that is, the first bracket 210 rotates along the circumferential direction of the fixing disc 100.

The elastic connection portion 215, through its own elasticity, ensures the better elasticity of the engaging between the first tooth slots 110 and the first engaging teeth 214. Under the action of the external force, the elastic connection portion 215 will undergo elastic deformation, such that the positioning between the first engaging teeth 214 and the first tooth slots 110 is released and then the both can rotate relative to each other.

There are various manners to achieve the rotation of the first bracket 210 around the circumferential direction of the fixing disc 100. The first bracket 210 may roll along the circumferential direction of the fixing disc 100 by means of a rolling body, thereby achieving its rotation; the fixing disc 100 may also slide along the circumferential direction of the fixing disc 100, thereby achieving its rotation.

In a specific implementation, an annular slideway may be provided on the fixing disc 100. The first bracket 210 is positioning-engaged with the annular slideway in a direction perpendicular to the disc surface of the fixing disc 100, and the first bracket 210 is slidably engaged with the fixing disc in the circumferential direction of the fixing disc 100. The positioning-engaging of the first bracket 210 with the annular slideway in the direction perpendicular to the disc surface of the fixing disc means that the first bracket 210 cannot move relative to the fixing disc 100 in the direction perpendicular to the disc surface, and can only move along the circumferential direction of the fixing disc 100, thereby achieving the rotation. Herein, the positioning-engaging of the first bracket 210 with the annular slideway in the direction perpendicular to the disc surface of the fixing disc 100 means that the first bracket 210 cannot move relative to the fixing disc 100 in the direction perpendicular to the disc surface of the fixing disc 100.

There are various manners to form the annular slideway on the fixing disc 100, for example, the annular slideway is formed on the disc surface of the fixing disc 100. As shown in FIGS. 3 and 4, an avoidance hole 120 is arranged in the center of the fixing disc 100. Specifically, the avoidance hole 120 may penetrate the fixing disc 100. The formation of the avoidance hole 120 makes the entire fixing disc 100 to be an annular structure member, and the first bracket 210 moves along the annular structure member, which can achieve the rotation of the first bracket 210 in the circumferential direction of the fixing disc 100.

Referring again to FIG. 2, FIG. 4 and FIG. 7, in the embodiment of the present application, there may be a plurality of lens brackets 200, and the plurality of lens brackets 200 may be distributed along the circumferential direction of the fixing disc 100. Specifically, the plurality of lens brackets 200 may be dispersedly arranged along the circumferential direction of the fixing disc 100.

Referring to FIGS. 1-4, in the lens adjuster disclosed in the embodiment of the present application, a lens bracket 200 includes a second bracket 220, and the second bracket 220 is arranged on the first bracket 210. The second bracket 220 can be rotationally engaged with the lens 300, in order to enable the lens to rotate around its own axis, achieving the purpose of adjusting the lens 300, that is, achieving the R-direction adjustment of the lens 300.

The second bracket 220 may be rotationally arranged on the first bracket 210 and can move in the direction perpendicular to the disc surface of the fixing disc 100, thereby achieving that the second bracket 220 drives the lens 300 to pitching-rotate relative to the fixing disc 100 or the first bracket 210, and finally achieving the adjustment of rotation of the lens 300 in the direction perpendicular to the disc surface of the fixing disc 100, that is, the T-direction adjustment.

In the embodiment of the present application, the first brackets 210 may have a variety of structural forms, so as to meet the requirement in different application scenarios, which will be described in details through different embodiments below.

Figure 5:
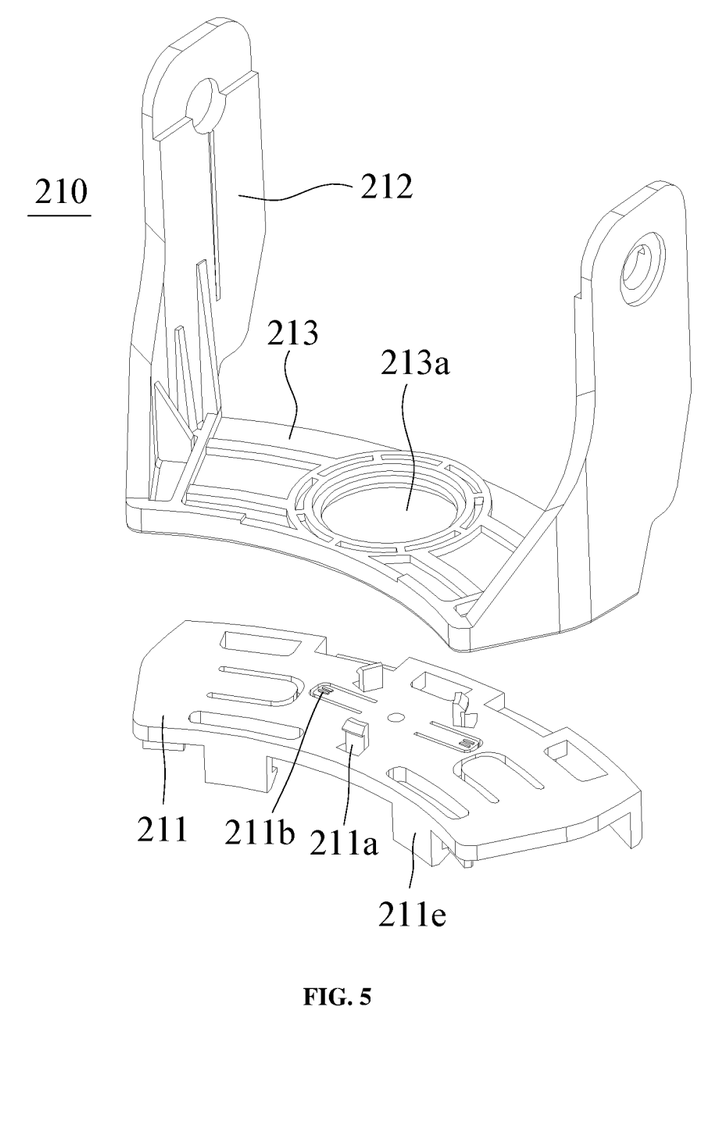
FIG. 5 is a schematic structural diagram of a first bracket under an angle of view according to an embodiment of the present application.
Figure 6:
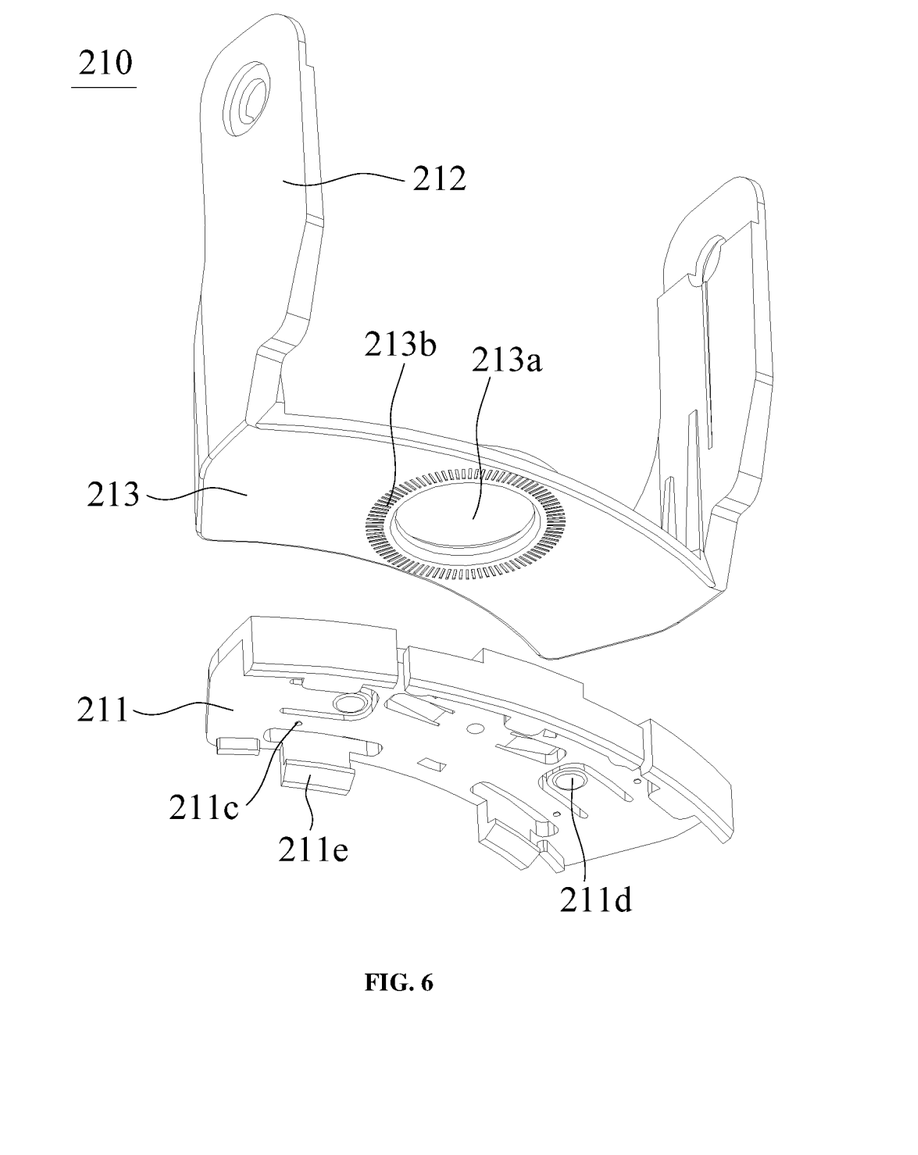
FIG. 6 is a schematic structural diagram of a first bracket under another angle of view according to an embodiment of the present application.

Referring to FIGS. 4-6, in an implementation of the embodiment of the present application, a first bracket 210 may include an independent connection base 211. The connection base 211 is provided with first fasteners 211e, and the connection base 211 is attached on the surface on one side of the fixing disc 100. Each of the first fasteners 211e is fixedly connected to the connection base 211 and passes through the avoidance hole 120 to be fastened to the fixing disc 100. The connection base 211 and the first fastener 211e are respectively engaged with the surfaces on both sides of the fixing disc 100, so that the first bracket 210 can be assembled on the fixing disc 110. During the rotation of the first bracket 210 in the circumferential direction of the fixing disc 100, the connection base 211 can slide relative to the surface on one side of the fixing disc 100; likewise, the first fastener 211e can slide relative to the surface on the other side of the fixing disc 100.

The elastic connection portion 215 may be used as an integral structure of the connection base 211 and the first fastener 211e, or may be independent of the connection base 211 and the first fastener 211e.

The first bracket 210 may include a connection base 211 and an elastic connection portion 215. The elastic connection portion 215 is a first elastic arm; one end of the first elastic arm is fixed on the connection base 211, and the other end thereof is a free end; the free end of the first elastic arm may be located outside the circular edge of the fixing disc 100. The free end of the first elastic arm can be elastically deformed relative to the connection base 211, thereby releasing the engaging to achieve relative rotation between the first bracket 210 and the fixing disc 100.

In order to ensure that the first bracket 210 does not rotate when it is not subjected to the external force or is subjected to a small interference force, in a preferred solution, at least one of the first bracket 210 and the fixing disc 100 is provided with a tightening portion that can be tightly attached to the other one of the both. Referring to FIGS. 4 and 5, the tightening portion may include a first tightening protrusion 211c and/or a second elastic arm 211d. In a preferred solution, the first bracket 210 includes a connection base 211; the connection base 211 is attached to the disc surface of the fixing disc 100; the connection base 211 has a bottom surface which is attached to the fixing disc 100; the bottom surface may be provided with the tightening protrusion 211c and the second elastic arm 211d, and the first tightening protrusion 211c and the second elastic arm 211d jointly achieve the tight attachment between the first bracket 210 and the fixing disc 100. The first bracket 210 may include a supporting arm 212 that is rotationally engaged with the second bracket 220; wherein, the supporting arm 212 is connected to the connection base 211. The second bracket 220 may be rotationally engaged with the supporting arm 212, thereby achieving that the second bracket 220 drives the lens 300 to pitching-rotate.

In order to increase the stability of the rotation of the lens 300, in a preferred solution, there may be two supporting arms 212, and the two supporting arms 212 are respectively arranged on both sides of the second bracket 220.

The supporting arms 212 may be fixedly connected or may be movably connected to the connection base 211, for example, the both are rotationally connected to each other. In a specific implementation, the first bracket 210 includes a connection base 211 and two supporting arms 212 rotationally connected to the connection base 211; and in this case, the supporting arms 212 can drive the lens 300 to rotate relative to the axis of the first bracket 210 by means of the second bracket 220.

Referring to FIGS. 2-8, the connection base 211 is provided with a plurality of second fasteners 211a; the two supporting arms 212 are connected to each other by a connection plate 213, the connection plate 213 is provided with a snap-in hole 213a, and the plurality of second fasteners 211a pass through the snap-in hole 213a and are clamping-engaged with the connection plate 213. In this case, the two supporting arms 212 achieve rotation relative to the connection base 211 by means of the connection plate 213, thereby achieving that the two supporting arms 212 drive the lens 300 to rotate around the axis of the lens bracket 200.

In order to ensure that the lens 300 can be maintained in the adjusted position after it is adjusted, in a preferred solution, one of the two surfaces, opposite to each other, of the connection plate 213 and the connection base 211 is provided with a plurality of second tooth slots 213b, and the other one of the two surfaces is provided with second engaging teeth 211b; and the second tooth slots 213b engage with the second engaging teeth 211b, such that the two supporting arms 212 are subjected to a certain resistance when the two supporting arms rotate relative to the connection plate 213, and thereby it is better ensured that the adjusted connection plate 213 remains stationary relative to the connection base 211 when the adjusted connection plate is not subjected to external force.

Specifically, the connection plate 213 is provided with second tooth slots 213b, and accordingly, the connection base 211 is provided with second engaging teeth 211b. Preferably, a plurality of second tooth slots 213b may be distributed on a circumference centered on the axis of the snap-in hole 213a, as shown in FIG. 5.

Figure 7:
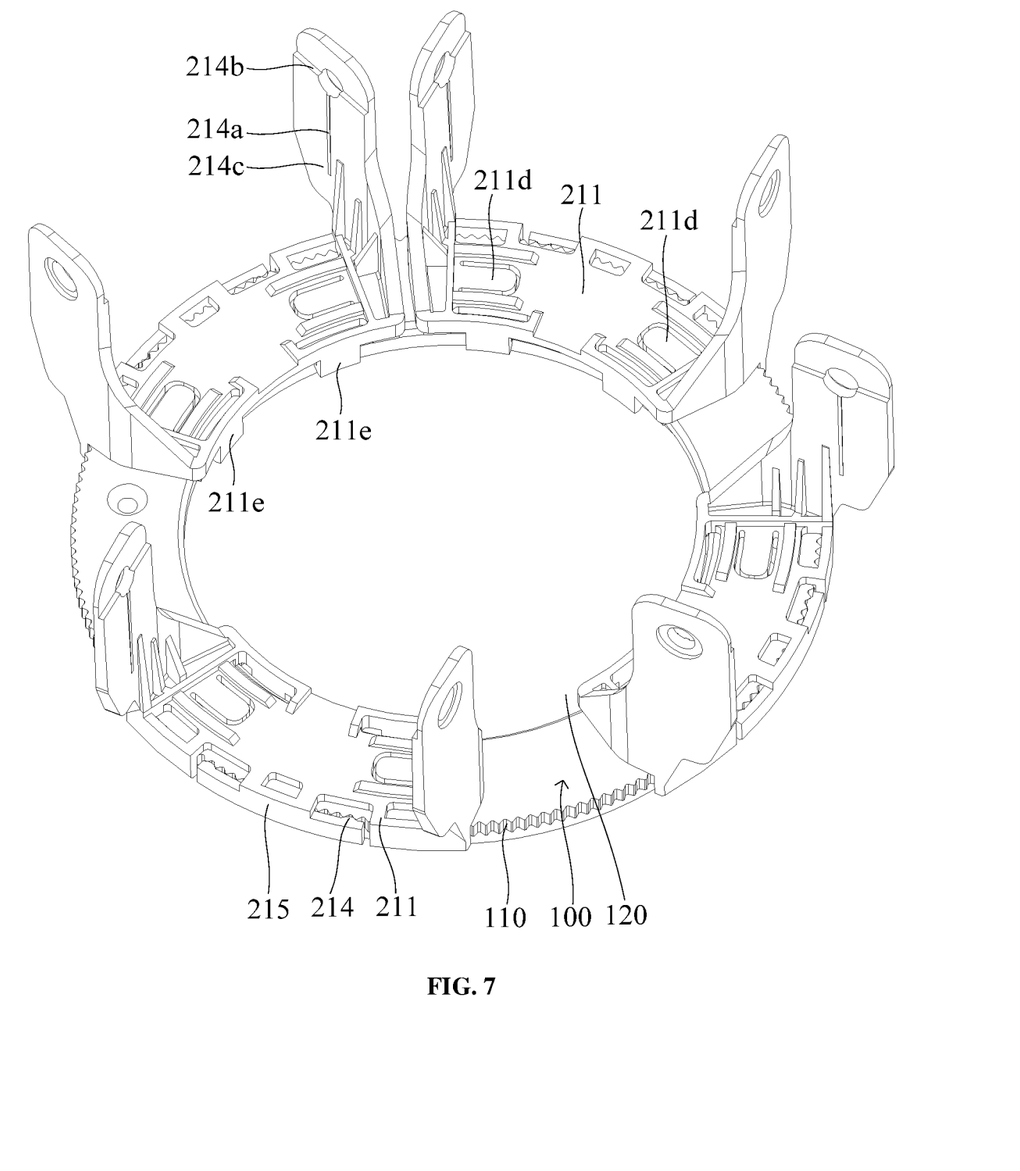
FIG. 7 is schematic structural diagram of yet another state of a lens adjuster mounted with lenses according to an embodiment of the present application.
Figure 8:
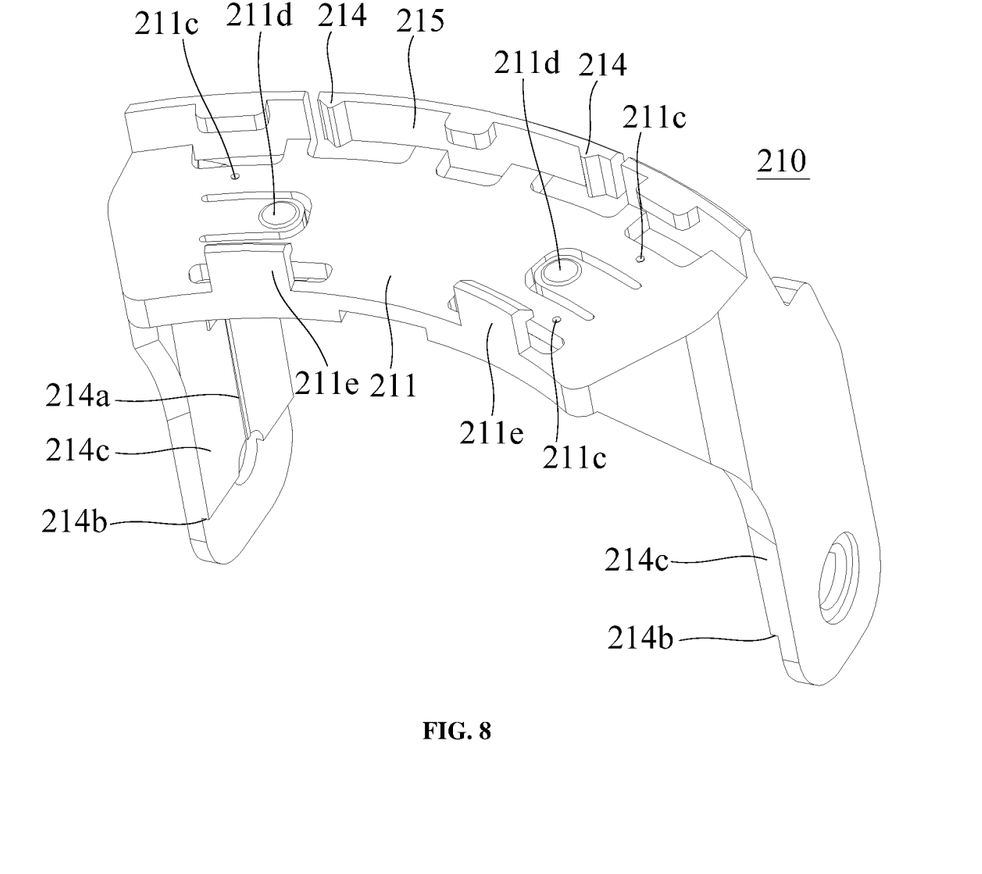
FIG. 8 is another schematic structural diagram of a first bracket according to an embodiment of the present application.
Figure 9:
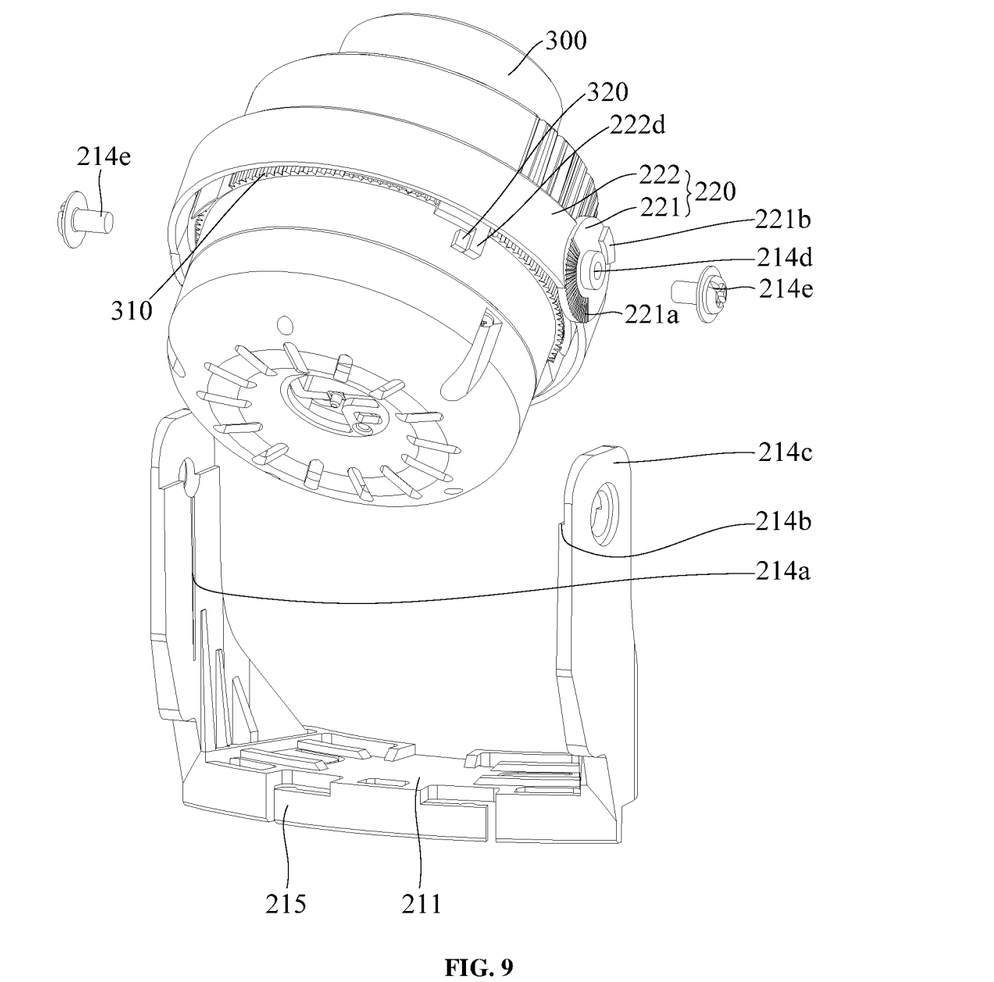
FIG. 9 is an exploded schematic structural diagram for assembling a first bracket and a lens according to an embodiment of the present application.

Referring to FIGS. 7-9, in another implementation of the embodiment of the present application, the connection base 211 of the first bracket 210 may be an integral structure with the supporting arms 212, that is, the supporting arms 212 are arranged on and fixedly connected to the connection base 211. Likewise, the connection base 211 is provided with a first fastener 211e, an elastic connection portion 215, a tightening portion, etc. Wherein, the elastic connection portion 215 is a first elastic arm; one end of the first elastic arm is fixed on the connection base 211 and the other end thereof is a free end; the free end of the first elastic arm may be located outside the circular edge of the fixing disc 100. The tightening portion may include first tightening protrusions 211c and/or second elastic arms 211d.

Referring to FIGS. 7-11, the first bracket 210 may also include supporting arms 212 that are rotationally engaged with the second bracket 220. The second bracket 220 includes tightening discs 221 that can be movably engaged with the supporting arms 212. A tightening disc 221 includes a tightening area. One of the tightening area and a supporting arm 212 is provided with a second tightening protrusion, and the other one of the both is provided with a plurality of tightening slots 221a extending in the radial direction of the tightening disc 221; and the tightening slots 221a engage with the second tightening protrusion. In a specific implementation, the tightening disc 221 is provided with tightening slots 221a; the supporting arm 212 is provided with a second tightening protrusion 214a; and the second tightening protrusion 214a and the tightening slots 221a can move relative to each other with the rotation of the second bracket 220. It should be noted that the engaging between the tightening slots 221a and the second tightening protrusion means that: the second tightening protrusion 214a and the tightening slots 221a are positioned when the second bracket 220 is not subjected to the external force, in order to ensure the lens 300 to be maintained at a certain position; when the second bracket 220 is subjected to the external force, under the action of the external force, the positioning between the second tightening protrusion 214a and the tightening slots 221a can be released due to elastic deformation, thereby enabling the both to rotate relative to each other.

In the actual application process, the lens 300 only needs to rotate relative to the second bracket 220 within a set angle range. Based on this, a supporting arm 212 may be provided with a third limiting part 214b, and a tightening disc 221 is provided with a fourth limiting part 221b and the fourth limiting part 221b can be position-limited engaged with the third limiting part 214b in the rotation direction of the tightening disc 221.

Referring to FIG. 9, in a specific implementation, a supporting arm 212 may include a supporting arm body 214c and a fixing block 214d fixed on the supporting arm body 214c. The fixing block 214d is movably engaged with the tightening disc 221, thereby achieving the relative rotation between the both. The fixing block 214d and the tightening disc 221 may be fixed to the supporting arm body 214c by means of a screw 214e. The above solution achieves the rotation of the lens 300 relative to the supporting arm 212 with the rotating engaging between the fixing block 214d and the tightening disc 221.

Also, in order to increase the stability of the rotation of the lens 300, in a preferred solution, there may be two supporting arms 212 respectively arranged on both sides of the second bracket 220.

The above two optional structural forms of the first bracket 210 and the supporting arm 212 are listed and may be selected and applied according to the requirements in the actual application.

Figure 10:
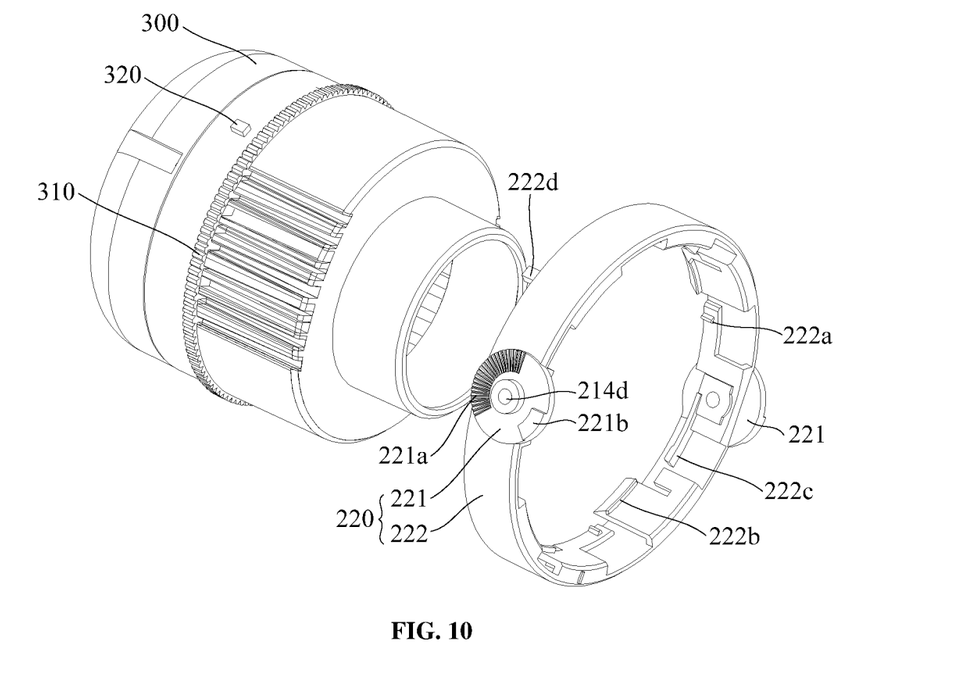
FIG. 10 and FIG. 11 are partial schematic structure diagrams of the multi-lens camera.
Figure 11:
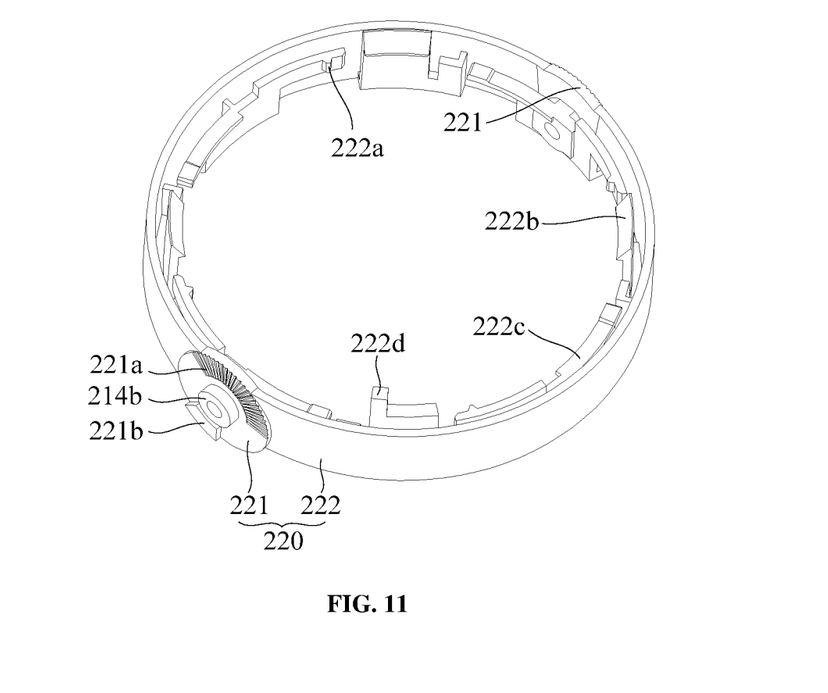

In the embodiment of the present application, referring to FIGS. 9 and 10, a second bracket 220 may include a tightening disc 221 and an annular structure member 222 and the annular structure member 222 is movably engaged with the lens 300, thereby enabling the lens 300 to rotate around its own axis. The tightening disc 221 may be arranged on the annular structure member 222 and can be rotationally engaged with the supporting arms 212.

One of the annular structure member 222 and the lens 300 may be provided with third tooth slots, and the other one of the both may be provided with third engaging teeth engaging with the third tooth slots; the third engaging teeth rotate in the circumferential direction of the lens 300 relative to the third tooth slots. Specifically, the third tooth slots 310 may be arranged on the lens 300, and accordingly, the third engaging teeth 222a may be arranged in the annular structure member 222.

The inner wall of the annular structure member 222 may be provided with third fasteners 222b and protrusion stops 222c. Each of the protrusion stops 222c is positioned in a set direction and engaged with the third tooth slots 310 on the lens 300 or one end of a third engaging tooth 222a, such that the annular structure member 222 cannot move relative to the lens 300 in the set direction. Each of the third fasteners 222b is fastened to the third tooth slots 310 on the lens 300 or the other end of the third engaging tooth 222a, thereby achieving axial positioning of the lens 300 and the annular structure member 222 in the axial direction of the annular structure member 222. It should be noted that the above-mentioned set direction is the axial direction of the lens 300.

Specifically, a protrusion stop 222c may be a third elastic arm perpendicular to the inner wall of the second bracket 220, and the third elastic arm is tight engaged with the third tooth slots 310 or one end of the third engaging teeth 222a.

During the actual application, the lens 300 typically rotates around its own axis within a certain angle range, and does not need to rotate around its own axis within the range of 360°. Based on this, referring again to FIGS. 4-6, in the preferred solution, the annular structure member 222 is provided with a first limiting part 222d; the lens 300 may be provided with a second limiting part 320; and the first limiting part 222d is position-limited engaged with the second limiting part 320 in the direction of lens 300 rotating around its own axis. The position-limited engaging of the first limiting part 222d with the second limiting part 320 only need to enable the lens 300 to rotate within a required angle range.

Referring again to FIG. 12, the multi-lens camera disclosed in the embodiment of the present application may further include a supporting mechanism 600; wherein, one end of the supporting mechanism 600 contacts with and is supported by the main housing assembly 400, and the other end thereof passes through the fixing disc 100 and contacts with and is supported by the flat portion 510. The supporting mechanism 600, the curved portion 520 and the main housing assembly 400 constitute a lens accommodating space 700, and the lenses 300 are located within the lens accommodating space 700.

Figure 12:
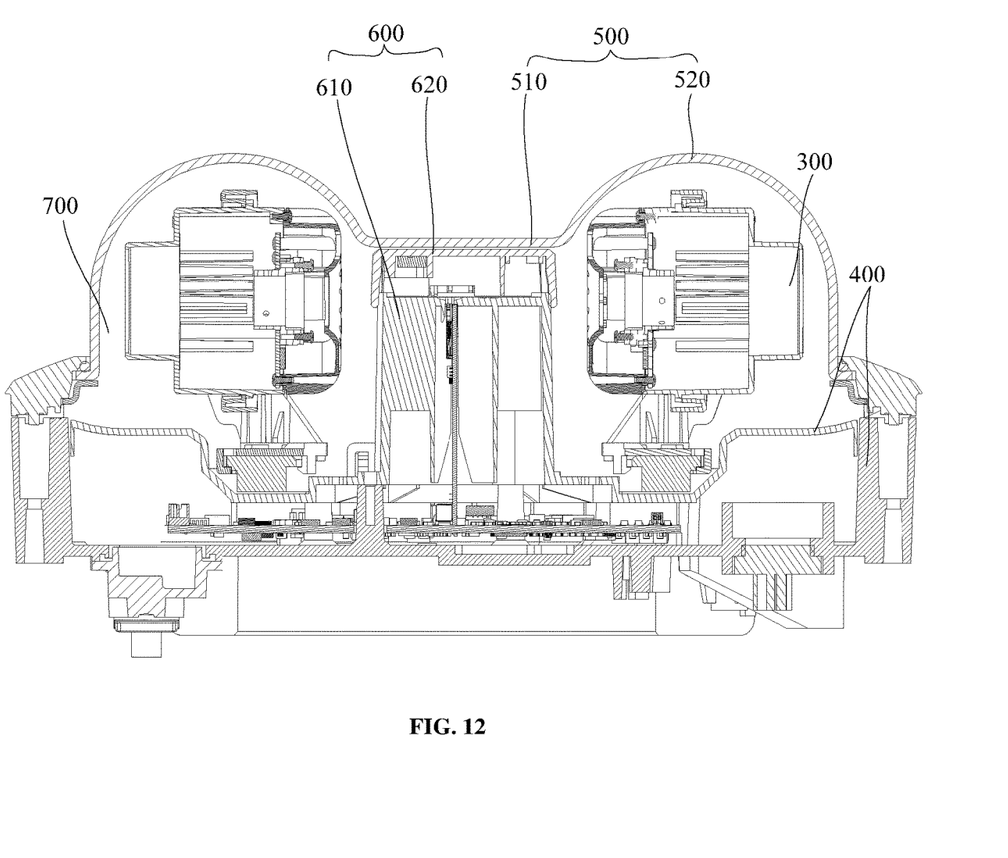
FIG. 12 is a sectional view of the multi-lens camera according to an embodiment of the present application.

In the multi-lens camera disclosed in the embodiment of the present application, one end of the supporting mechanism 600 contacts with and is supported by the main housing assembly 400, and the other end thereof passes through the lens adjuster and contacts with and is supported by the flat portion 510, to achieve the support for the transparent cover 500. This structure makes the transparent cover 500 less deformed when subjected to the external force, thereby improving the resistance to deformation of the transparent cover 500 and finally increasing the explosion-proof performance of the multi-lens camera.

There are various structures of the supporting mechanism 600. In a specific implementation, the supporting mechanism 600 may include a supporting body 610 and an elastic pad 620; one end of the supporting body 610 may be fixed on the main housing assembly 400; and the elastic pad 620 is supported between the other end of the supporting body 610 and the flat portion 510.

The supporting body 610 is a main supporting member. The supporting body 610 is supported on the flat portion 510 by means of the elastic pad 620. The elastic pad 620 can ensure that the contact between the supporting mechanism 600 and the transparent cover 500 is elastic, in order to prevent the transparent cover 500 from the rigid contact with the supporting body 610 when the transparent cover is impacted and further to be able to reduce the probability of breakage of the transparent cover 500. As described above, the main housing assembly 400 typically includes a plurality of components, and one end of the supporting body 610 may be fixedly connected to at least one of the plurality of components included in the main housing assembly 400, thereby achieving fixed connection with the main housing assembly 400.

Herein, the technical features in the various preferred solutions may be combined to obtain a solution as long as they do not contradict with each other, and all of these solutions fall within the scope disclosed in the present application.

Herein, the description for the various preferred solutions only focuses on the differences from other preferred solutions. As long as there is no conflict, the preferred solutions can be combined in any way, and the combined embodiments are also within the scope disclosed in the present specification. Considering the simplicity of the text, the embodiments formed by the combination will be not described separately herein.

It should be noted that the relationship terms used herein, such as "first", "second" and the like are only to distinguish one entity or operation from another entity or operation, but do not necessarily require or imply that there is an actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the embodiments in the description are described in a correlated manner, and identical or similar parts in various embodiments can refer to one another. In addition, the description for each embodiment focuses on the differences from other embodiments.

The embodiments described above are simply preferable embodiments of the present application, and are not intended to limit the present application. Any modifications, alternatives, improvements, or the like within the spirit and principle of the present application shall be included within the scope of protection of the present application.

The invention claimed is:

1. A multi-lens camera, comprising: a main housing assembly, lenses, a lens adjuster, and a transparent cover; wherein, the transparent cover is mounted on the main housing assembly; the lens adjuster is mounted in a space formed by the main housing assembly and the transparent cover; the transparent cover comprises a flat portion and a curved portion surrounding the flat portion; the lenses are located in a space covered by the curved portion; the lens adjuster comprises a fixing disc and at least two lens brackets; each of the lens brackets comprises a first bracket and a second bracket arranged on the first bracket; the first bracket is movably arranged on the fixing disc and able to move along a circumferential direction of the fixing disc; and a lens is rotationally engaged with the second bracket in order to enable the lens to rotate around its own axis;

wherein, one of the first bracket and the fixing disc is provided with first tooth slots, and other one of the first bracket and the fixing disc is provided with first engaging teeth; the first bracket is connected to the fixing disc by means of engagement between the first tooth slots and the first engaging teeth.

2. The multi-lens camera of claim 1, wherein, a circular edge of the fixing disc is partly or entirely provided with the first tooth slots, the first bracket is provided with the first engaging teeth and the first bracket is able to move along the circumferential direction of the fixing disc.

3. The multi-lens camera of claim 2, wherein, the first bracket comprises an elastic connection portion that is provided with the first engaging teeth, and the first engaging teeth are connected with the first tooth slots by means of elastic engagement.

4. The multi-lens camera of claim 3, wherein, the first bracket comprises a connection base and the elastic connection portion, the elastic connection portion is a first elastic arm; one end of the first elastic arm is fixed to the connection base and other end of the first elastic arm is a free end; the other end of the first elastic arm is located outside the circular edge.

5. The multi-lens camera of claim 1, wherein, an annular slideway is provided on the fixing disc, and the first bracket is positioned in a direction perpendicular to the fixing disc and engaged with the annular slideway, and the first bracket is able to move in the circumferential direction of the fixing disc.

6. The multi-lens camera of claim 5, wherein, an avoidance hole is arranged in a center of the fixing disc.

7. The multi-lens camera of claim 6, wherein, the first bracket comprises a connection base and first fasteners; the connection base is attached on a surface on one side of the fixing disc; the first fasteners are fixedly connected with the connection base and pass through the avoidance hole so as to be fastened to the fixing disc.

8. The multi-lens camera of claim 1, wherein, at least one of the first bracket and the fixing disc is provided with a tightening portion that is able to be tight attached to other one of the first bracket and the fixing disc.

9. The multi-lens camera of claim 8, wherein, the tightening portion comprises a first tightening protrusion and/or a second elastic arm.

10. The multi-lens camera of claim 9, wherein, the first bracket comprises a connection base, the connection base is attached to a disc surface of the fixing disc, the connection base has a bottom surface attached to the fixing disc, and the bottom surface is provided with the first tightening protrusion and the second elastic arm.

11. The multi-lens camera of claim 1, wherein, the first bracket comprises a connection base and two supporting arms, the two supporting arms are arranged on the connection base, the connection base is mounted on the fixing disc, and the two supporting arms are rotationally connected to the connection base.

12. The multi-lens camera of claim 11, wherein, the connection base is provided with a plurality of second fasteners; the two supporting arms are connected to each other by a connection plate; the connection plate is provided with a snap-in hole; and the plurality of second fasteners pass through the snap-in hole and are clamping-engaged with the connection plate.

13. The multi-lens camera of claim 12, wherein, one of two surfaces, opposite to each other, of the connection plate and the connection base is provided with a plurality of second tooth slots, and other one of the two surfaces is provided with second engaging teeth, and the second tooth slots engage with the second engaging teeth.

14. The multi-lens camera of claim 13, wherein, the plurality of second tooth slots are distributed on a circumference centered on an axis of the snap-in hole.

15. The multi-lens camera of claim 1, wherein, the multi-lens camera further comprises a supporting mechanism; one end of the supporting mechanism contacts with and is supported by the main housing assembly, and other end of the supporting mechanism contacts with and is supported by the flat portion; the supporting mechanism, the curved portion and the main housing assembly constitute a lens accommodating space within which the lenses are located.

16. The multi-lens camera of claim 15, wherein, the supporting mechanism comprises a supporting body and an elastic pad; one end of the supporting body is fixed on the main housing assembly; and the elastic pad is supported between other end of the supporting body that passes through the fixing disc and the flat portion.

* * * * *

UNITED STATES PATENT AND TRADEMARK OFFICE
CERTIFICATE OF CORRECTION

PATENT NO. : 11,525,973 B2
APPLICATION NO. : 16/771363
DATED : December 13, 2022
INVENTOR(S) : Yang Li et al.

It is certified that error appears in the above-identified patent and that said Letters Patent is hereby corrected as shown below:

On the Title Page

Column 1, item (73), Assignee's name should read "HANGZHOU HIKVISION DIGITAL TECHNOLOGY CO., LTD."

Signed and Sealed this
Eighteenth Day of April, 2023

Katherine Kelly Vidal
*Director of the United States Patent and Trademark Office*